United States Patent [19]

Tabata et al.

[11] Patent Number: 4,545,068
[45] Date of Patent: Oct. 1, 1985

[54] IMAGE PROCESSING SYSTEM

[75] Inventors: Mitsuo Tabata; Masatsugu Kidode, both of Yokohama; Noboru Yamaguchi, Tokyo, all of Japan

[73] Assignee: Tokyo Shibaura Denki Kabushiki Kaisha, Kawasaki, Japan

[21] Appl. No.: 463,599

[22] Filed: Feb. 3, 1983

[30] Foreign Application Priority Data

Feb. 10, 1982 [JP] Japan ................. 57-18942

[51] Int. Cl.⁴ .................. G06K 9/36; G06F 15/20
[52] U.S. Cl. .................. 382/41; 358/256; 358/903; 364/900; 382/44
[58] Field of Search ........ 382/41, 44, 49, 56, 382/69; 340/798, 799; 358/166, 256, 903; 364/518, 900 MS File, 200 MS File

[56] References Cited

U.S. PATENT DOCUMENTS 3,905,018  9/1975  Gray .................. 382/49
4,120,049 10/1978  Thaler et al. ......... 382/44
4,395,699  7/1983  Sternberg ............ 382/41
4,442,495  4/1984  Sukonick ............. 340/799

Primary Examiner—Leo H. Boudreau
Attorney, Agent, or Firm—Oblon, Fisher, Spivak, McClelland & Maier

[57] ABSTRACT

An image processing system is disclosed which includes: a control computer which has a CPU and a main memory therein; and an image memory section which is connected to the CPU through an interface and which has an image memory for digitally storing image data, a memory controller and an image processor. A memory area as part of the main memory is independently allocated to store as a register area data transferred through a privately leased data bus which bypasses the interface between the control computer and the image memory section. When random access operation of the image data with respect to the image memory is performed, the data transfer between the CPU and the image memory section can be performed through the memory area (register area) and the special data bus without going through the interface.

13 Claims, 2 Drawing Figures

IMAGE PROCESSING SYSTEM

BACKGROUND OF THE INVENTION

The present invention relates to an image processing system and, more particularly, to an image processing system which includes an image memory and a control computer and which effectively performs data access at high speed between the image memory and control computer.

An image memory in an image processing system is generally regarded as an external peripheral component with respect to the control computer. Therefore, an interface is arranged between the image memory and the control computer via a data bus. The data is read out from the image memory always through the interface. In order to read out image data from the image memory and fetch it in the control computer or write image data in a desired memory area of the image memory, a series of steps of various operations must be performed. For example, data transfer control through the data bus must be performed. Mode designation data which indicates the mode of the interface, and the data to be stored must be properly selected. Furthermore, a read/write signal must be properly controlled. The data access control for the image memory which includes various types of control operations and/or data selection with respect to the interface must be repeated every time data access of the image memory in the image processing system is performed. Therefore, the data access procedure is very cumbersome, and a total access operation is undesirably time consuming. The interface of the image processing system is connected to a number of peripheral devices such as a data input unit, a display unit, a hard copy unit and the like, besides the image memory. Data access cannot be performed while the interface is being operated for any peripheral device other than the image memory. In other words, data access may only be performed while the interface is in the ready state. Therefore, the long total access time including the access time which is required to perform cumbersome procedures including the various operations described above, results in a drawback, preventing effective image processing.

In this manner, according to the conventional image processing system, before data transfer between the control computer and the image memory it must be checked whether or not the interface is in the ready state and whether or not a device is available to receive data. When data to be read out from a memory area of the image memory corresponds to a given screen area of the display unit, and data is subsequently displayed in accordance with raster scanning, the conditions of the interface and of the device which receives data do not present a major problem. However, when the operator wishes to randomly access data of a large number of pixels many times among those pixels the data of which is stored in the image memory, access control time is greatly increased, thus degrading the efficiency of the image processing operation, and hence entailing a distinct problem.

SUMMARY OF THE INVENTION

It is, therefore, an object of the present invention to provide a new and improved image processing system which effectively performs data access of an image memory, thereby processing an image at high speed.

It is another object of the present invention to provide a new and improved image processing system which simplifies the control operation for image memory access and which eliminates latency or dead time, thereby effectively accessing the image memory.

In order to achieve the above objects of the present invention, there is provided an image processing system comprising a control computer which has a CPU and a main memory therein; and an image memory section. The image memory section includes an image memory for digitally storing image data, a memory controller for controlling read/write operation of the image data with respect to the image memory, and an image processor for performing image processing of the type selected in accordance with the image data stored in the image memory. A predetermined memory area of the main memory is independently allocated as a access register region for storing data exchanged between the CPU of the control computer and the image memory section. The image memory section is connected to the CPU of the control computer through the register region, thus bypassing the interface.

BRIEF DESCRIPTION OF THE DRAWINGS

The present invention is best understood by reference to the accompanying drawings, in which.

DETAILED DESCRIPTION OF THE PREFERRED EMBODIMENT

Figure 1:
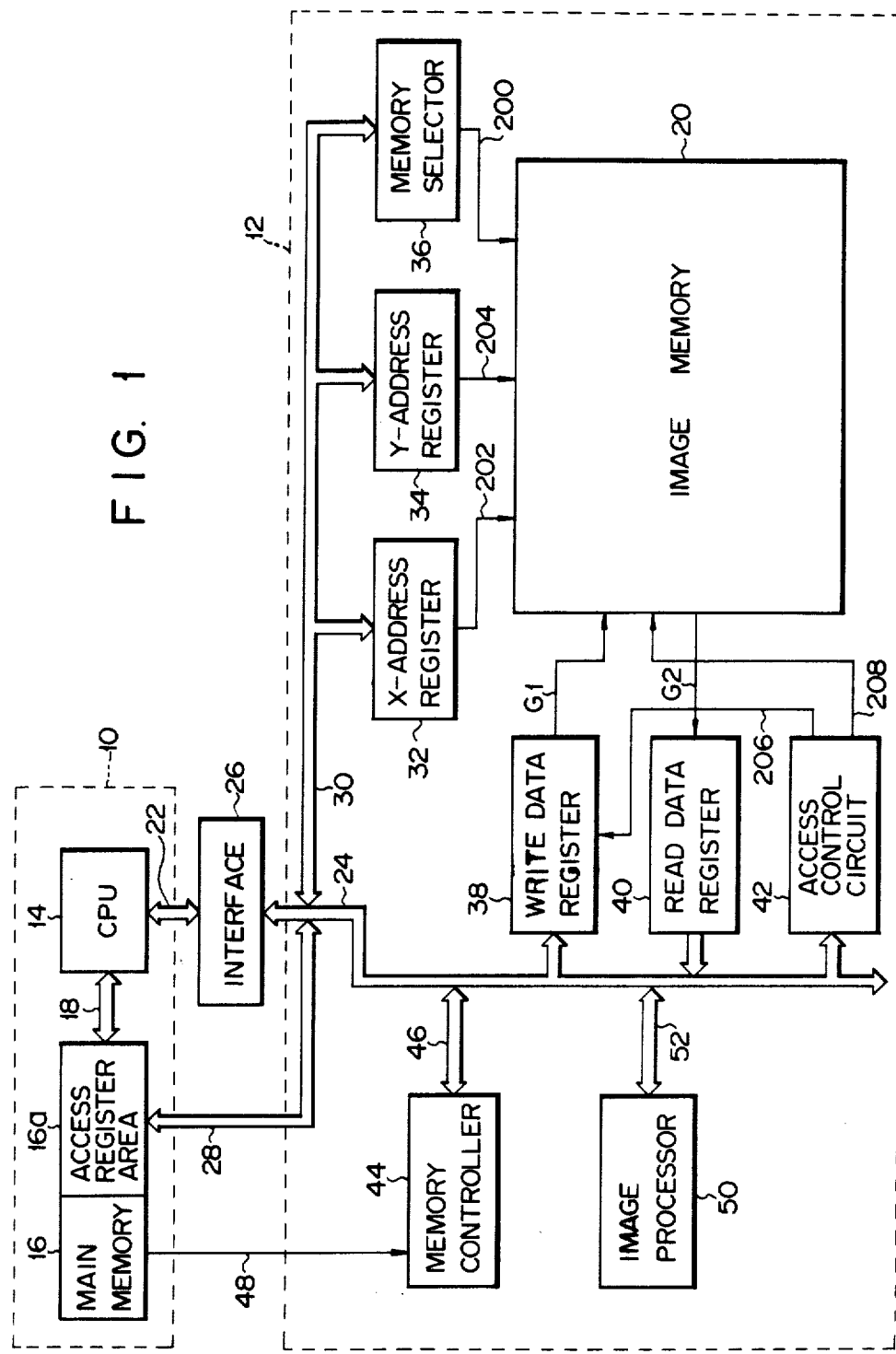
FIG. 1 is a block diagram schematically showing the overall configuration of an image processing system according to an embodiment of the present invention.

Referring now to FIG. 1, an image processing system according to the present invention is illustrated. The image processing system includes a control computer 10 and an image memory section 12. The control computer 10 comprises a central processing unit (CPU) 14, and a main memory 16 connected to the CPU 14 through a data bus 18. The main memory 16 prestores a control program of the CPU 14. The image memory section 12 has an image memory 20 which equivalently comprises a plurality of pixel matrices each having a size of several bits corresponding to n×m pixels (where n and m are positive integers). The CPU 14 of the control computer 10 is connected to the image memory section 12 through an interface 26 via data buses 22 and 24. The CPU 14 is also connected to the image memory section 12 through the main memory 16 via a data bus 28, as well as through the interface 26 via data buses 22 and 24. A partial memory area 16a of the main memory 16 connected to the CPU 14 is allocated as a memory area for temporarily storing data concerning data access of the image memory 20. The partial memory area 16a (to be referred to as an access register area hereinafter) is connected to the image memory section 12 via the data bus 28. As a result, the CPU 14 is connected to the image memory section 12 through the interface 26 via a first data transfer line (corresponding to the data buses 22 and 24) and through the access register area 16a of the main memory 16 via the second data transfer line (corresponding to the data buses 18 and 28). The second data transfer line from the CPU 14 to the image memory section 12 through the access register area 16a bypasses the first data transfer line.

Since the data bus 28, which may be a privately leased data bus which is directly connected from the access register area 16a of the main memory 16 to the data bus 24 which is connected to the interface 26, the data bus 28 bypasses the interface 26. The data bus 28 is then connected to a data bus (internal data bus) 30. The data bus 30 is connected to an address register (X-address register) 32 for accessing a row address (X address) of the image memory 20, an address register (Y-address register) 34 for accessing a column address (Y address) thereof, and a memory select register (to be referred to as a memory selector hereinafter) 36 for selecting at least one pixel matrix from a plurality of pixel matrices which constitute the image memory 20. The data bus 24 which is connected to the data buses 28 and 30 is connected to a write data register 38 for temporarily storing image data (write data) to be stored in the image memory 20, a read data register 40 for temporarily storing image data (read data) which has been read out from the image memory 20, and an access control circuit 42 for producing a data signal, data read/write control signal, and so on.

A memory controller 44 is connected through a data bus 46 to the data bus 24 which runs inside the image memory section 12. The memory controller 44 is also connected to the main memory 16 through a signal line 48. The memory controller 44 serves to control the overall operation of the image memory section 12 which includes the peripheral components 32, 34, 38 and 40 connected to the image memory 20. An image processor 50 is connected to the data bus 24 through a data bus 52. The image processor 50 functions to perform predetermined types of image processing (for the image data stored in the image memory 20) such as 9-bit pattern generation in a 3×3 local mask for logical filtering, multiply-summation with weighting coefficients (two-dimensional convolution) for spatial filtering, maximum/medium/minimum value detection in a 3×3 local area with its position for non-linear filtering (ex. median filter).

Figure 2:
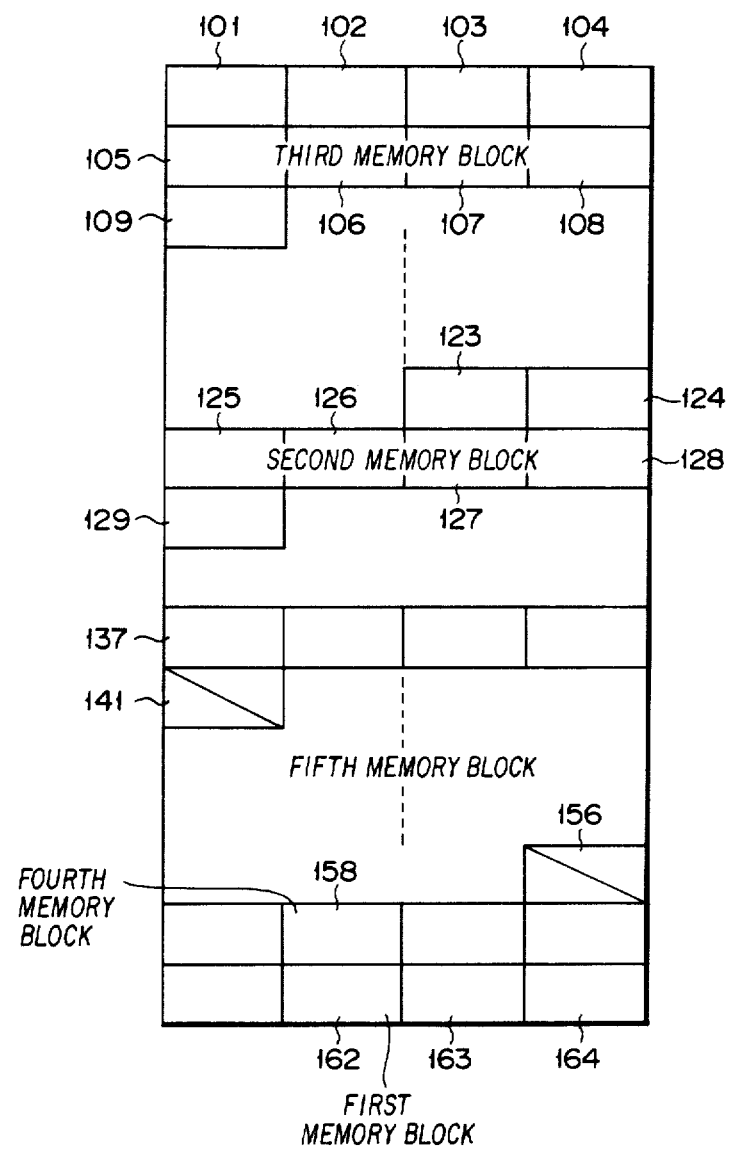
FIG. 2 is a model partially showing an internal structure of the main memory of the image processing system shown in FIG. 1.

FIG. 2 is a model showing the allocation of the access register area 16a of the main memory 16. A 64-byte (512-bit) memory area among the whole memory area (i.e., 64K bytes) of the main memory 16 is assigned as the access register area 16a in this embodiment. The access register region 16a is illustrated in FIG. 2 where a memory area corresponding to one byte is defined as a unit memory block.

Referring to FIG. 2, 64 unit memory blocks (one byte each) are designated by reference numerals 101, 102, 103, 104, 105, ..., 163 and 164 from the upper left corner to the lower right corner, respectively. The order of the unit memory blocks which is designated by the reference numerals is used only for illustrative convenience. The unit memory block 104 stores select data for designating at least one pixel matrix of the image memory 20 which consists of a plurality of pixel matrices. Two pairs of unit memory blocks 105 and 106, and 107 and 108 respectively access X-address data and Y-address data of readout data for one pixel matrix of the image memory 20. The plurality of unit memory blocks 109 to 123 store image data read out from the image memory 20. The unit memory block 124 stores select data for designating at least one pixel matrix in which data is to be written. Two pairs of unit memory blocks 125 and 126, and 127 and 128 respectively store X-address data and Y-address data of write data for one pixel matrix of the image memory 20. The plurality of unit memory blocks 129 to 137 store image data to be written in the image memory 20.

The plurality of unit memory blocks 141 to 156 of the access register area 16a shown in FIG. 2 prestore parameter data and normalization data necessary for operation of the image processor 50. The unit memory block 158 designates the type of operation performed by the image processor 50. The unit memory block (command storage block) 162 stores command data for the memory controller 44.

In the image processing system which has the configuration described above, the CPU 14 of the control computer 10 has the data transfer line 28 through the interface 26 as well as the independent data transfer line through the access register area 16a assigned in the main memory 16. The image memory section 12 includes the memory controller 44 and the image processor 50. The memory controller 44 and the image processor 50 are connected to the control computer 10 through the privately leased signal line 48 without the intermediacy of the interface 26. The memory controller 44 is arranged so as to directly receive a command signal for image processing from the main memory 16 of the control computer 10 through the signal line 48. Therefore, the control computer 10 can fetch data from the image memory 20 of the image memory section 12 without going through the interface 26. This means that the procedure for checking whether or not the interface 26 is in the ready state can be omitted. In this manner, the number of steps of necessary procedures for image access is decreased, so that the processing time for image access can be shortened as a whole. As a result, high-speed image processing can be performed.

When the operator especially wishes to randomly access a large number of pixels many times, data of which are stored in the image memory 20, the access time can be greatly shortened. For example, operations such as the random access operation of an image by accessing the X and Y addresses of the image memory 20, and the tracking operation of the contour line of an input graphic pattern can be performed by data transmission through the data bus 28, but without going through the interface 26. Furthermore, since the commands from the control computer 10 are supplied to the memory controller 44 through the main memory 16 and the signal line 48, effective command operations can be performed. The operations can be effectively performed at high speed under the control of the main memory 16; for example, data of a 3×3 local mask having 9 neighboring pixels including as a central address a pixel of image data can be read out, and local operation of image data can be performed such as a two-dimensional convolution (multiply-summation), or the detection of maximum/medium/minimum value with its direction.

Command data is used to read out data from the image memory 20 of the image memory section 12 using the access register area 16a but without going through the interface 26. A plurality of command data are predetermined in accordance with the types of random access operations and image processing. When command data which indicates a predetermined and selected type of operation is fetched in the command storage block 162 of the access register area 16a of the main memory 16 under the control of the CPU 14, this command data is transmitted to the memory controller 44 through the signal line 48. The memory controller 44 is then started in response to the command data supplied through the signal line 48. The memory controller 44 transfers the storage contents of the access register area 16a of the main memory 16 to the registers 32, 34, 38 and 40 of the image memory section 12 through the data bus 28. The memory controller 44 can alternatively write image data read out from the image memory 20 in the access register area 16a.

If data G1 is to be written in a pixel position (I, J) (where I is the X-address data and J is the Y-address data) of the Nth pixel matrix among the plurality of pixel matrices, the CPU 14 of the control computer 10 transmits a plurality of commands to the access register area 16a of the main memory 16. Data N (indicating the Nth pixel matrix), I, J, and G1 are stored in the access register area 16a in accordance with the commands from the CPU 14. Subsequently, when the CPU 14 sets the command data in the access register area 16a, this command data is supplied to the memory controller 44 through the signal line 48, thereby starting the memory controller 44. The data N which designates the pixel matrix is set in the memory selector 36 through the data buses 24 and 30 under the control of the memory controller 44. The memory selector 36 produces a memory select signal 200 in accordance with the data N. The X-address data I and the Y-address data J are set in the X-address register 32 and the Y-address register 34, respectively, under the control of the memory controller 44. The X- and Y-address registers 32 and 34 generate address access signals 202 and 204 to access the X and Y addresses, respectively. When the data I and J (not shown) are completely set in the X- and Y-address registers 32 and 34, respectively, the write data G1 is then set in the write data register 38 in response to a timing signal 206 generated from the access control circuit 42. When data setting for the write data register 38 in response to the timing signal 206 is completed, the access control circuit 42 then supplies a write start signal 208 to the image memory 20. The pixel position (I, J) (not shown) of the Nth pixel matrix selected by the memory select signal 200 from the memory selector 36 is selected by the X- and Y-address registers 32 and 34 from the plurality of pixel matrices of the image memory 20. Finally, the data G1 set in the write data register 38 is then written in the pixel position (I, J).

The command data includes a status data bit. The status data bit is set to logic level "1" during the image access operation in accordance with the command of the access register area 16a and is then set to logic level "0" when the image access operation is completed. When the status data bit is set to logic level "1", data cannot be read out from or written in the access register area 16a by accessing any other address thereof. When the status bit is then set to logic level "0", the memory controller 44 signals the end of the operation to the control computer 10 by setting a flag which indicates the end of operation, or by an interrupt operation.

A case will now be described in which image data G2 is read out from a pixel position (I', J') (not shown) of the N'th pixel matrix among the plurality of pixel matrices of the image memory 20. In this case, data set in the access register area 16a of the main memory 16, that is, data N' for designating the pixel matrix number and data I' and J' for accessing the X and Y addresses, are respectively set in the memory selector 36 and the X- and Y-address registers 32 and 34 through the data bus 28 under the control of the memory controller 44 which receives the command data through the signal line 48. Therefore, after the N'th pixel matrix is selected by the memory selector 36, the image data G2 in the pixel position (I', J') of the N'th pixel matrix is read out under the control of the memory controller 44 and is stored in the read data register 40. The image data G2 stored in the read data register 40 is set in the access register area 16a of the main memory 16 of the control computer 10 through the data buses 24 and 28. The CPU 14 fetches this data from the access register area 16a, thus obtaining the image data G2.

The operation of the image processing system of FIG. 1 is described when data of a 3×3 local area having a predetermined pixel among the predetermined pixel matrix of the image memory 20 is read out. Assume that the CPU 14 of the control computer 10 is to fetch data of a 3×3 local area which includes the pixel position (I, J) of the Nth pixel matrix of the image memory 20 and the nearest pixel points or neighboring pixels surrounding the pixel position (I, J). The CPU 14 sequentially sets memory select data N, X- and Y-address data I and J, and mode designation data M1 (not shown) for designating the readout of data of the 3×3 local area in the access register area 16a of the main memory 16. When the CPU 14 then sets a start command in the access register area 16a, the start command is transmitted to the memory controller 44 through the signal line 48, thereby starting the memory controller 44. The data N, I and J are respectively set in the registers 36, 32 and 34 through the data buses 28 and 30. Subsequently, the mode designation data M1 is supplied to the memory controller 44. The memory controller 44 decodes the mode designation data M1 and detects that readout of the 3×3 local area data is requested. The memory controller 44 then controls the X-address register 32 and the Y-address register 34 so as to change the contents thereof in the orders of I−1, I and I+1 and of J−1, J and J+1, respectively. Image data at a pixel position (I−1, J−1) of the Nth pixel matrix, image data at a pixel position (I, J−1) thereof, image data at a pixel position (I+1, J+1), . . . , and so on are subsequently read out and are transmitted to and stored in the unit memory blocks 109 to 124 of the access register area 16a of the main memory 16 through the data bus 28. The CPU 14 then fetches data in the access register area 16a of the main memory 16 to readily obtain the 3×3 local area data.

Finally, a case is described in which the CPU 14 causes the image process 50 to perform a predetermined type of operation such as the detection of the maximum/medium/minimum values in the 3×3 local area, and calculation of the directions thereof. Data which indicates the predetermined type of operation is set in the unit memory block 158 of the access register area 16a of the main memory 16. At the same time, parameter data required for the predetermined type of operation are set in the unit memory blocks 141 to 156. The image processor 50 receives the set of data described above through the data buses 28, 24 and 52, and performs the predetermined type of operation for the image data stored in the image memory 20. The operation results, such as the detection of maximum, medium and minimum values, and the direction from the maximum value position to the minimum value position and vice versa, are supplied to and set in the access register area 16a of the main memory 16 through the data bus 28. Therefore, the CPU 14 fetches data from the access register area 16a to readily obtain the operation results by the image processor 50 at high speed.

Although the present invention has been shown and described with respect to a particular embodiment, nevertheless, various changes and modifications which are obvious to a person skilled in the art to which the invention pertains are deemed to lie within the spirit, scope and contemplation of the invention.

What we claim is:

1. An image processing system comprising:
    an image memory section having an image memory for digitally storing image data, a memory controller for controlling a read/write operation of the image data with respect to said image memory, and an image processor for performing a selected type of image processing operation for the image data stored in said image memory;
    a control computer having a central processing unit and a main memory connected to said central processing unit, said main memory having a predetermined size of a partial memory area, which is presecured as a special-purpose memory area for storing image data transferred between said control computer and said image memory section and is separated from the remaining memory area of said main memory;
    an interface connected between said central processing unit and said image memory section;
    first data bus means for connecting said central processing unit to said image memory section through said interface; and
    second data bus means for directly connecting said special-purpose memory area to said image memory section and allowing said special-purpose memory area to directly store, without involving said interface, only image data randomly read out from said image memory under the control of said central processing unit, whereby said control computer is able to directly access said image memory through said second data bus means without involving said interface.

2. A system according to claim 1, wherein said image memory section includes an internal data bus, and said memory controller is connected to said central processing unit of said control computer through said memory area via said internal data bus and said second data bus means so as to directly read out the image data from said special-purpose memory area of said main memory.

3. A system according to claim 2, wherein said image processor is connected to said central processing unit through said special-purpose memory area of said main memory via said internal data bus and said second data bus means, so as to designate a type of operation performed by said image processor and to obtain an operation result by said image processor when said central processing unit accesses said special-purpose memory area of said main memory.

4. A system according to claim 3, wherein said special-purpose memory area of said main memory includes:
    a first memory block for storing control data from said central processing unit, the control data including command data for said memory controller;
    a second memory block for temporarily storing address access data and input image data which are used for storing desired image data at a predetermined address of said image memory; and
    a third memory block for temporarily storing output address access data and output image data which are used for reading out the image data from the predetermined address of said image memory.

5. A system according to claim 4, wherein said special-purpose memory area further includes a fourth memory block for storing data which indicates the type of operation to be performed by said image processor.

6. A system according to claim 5, wherein said special-purpose memory area further includes a fifth memory block for prestoring parameter data and normalization data which are used for the image processing operation performed by said image processor.

7. A system according to claim 1, wherein said image memory section includes an internal data bus, and said memory controller and said image processor are connected to said central processing unit of said control computer through said special-purpose memory area of said main memory via said internal data bus and said second data bus.

8. A system according to claim 7, wherein said special-purpose memory area of said main memory includes:
    a first memory block for storing control data from said central processing unit, the control data including command data for said memory controller;
    a second memory block for temporarily storing address access data and input image data which are used for storing desired image data at a predetermined address of said image memory; and
    a third memory block for temporarily storing output address access data and output image data which are used for reading out the image data from the predetermined address of said image memory.

9. A system according to claim 8, wherein said special-purpose memory area further includes a fourth memory block for storing data which indicates the type of operation to be performed by said image processor.

10. A system according to claim 9, wherein said special-purpose memory area further includes a fifth memory block for prestoring parameter data and normalization data which are used for the image processing operation performed by said image processor.

11. A system according to claim 1, further comprising signal line means for directly connecting said memory controller to said remaining memory area of said main memory to directly supply only a command signal, produced from said control computer to specify data access to said image memory, to said memory controller without involving said interface.

12. A system according to claim 11, wherein said central processing unit of said control computer performs data transfer with said image memory section through one of a first data transfer path, which includes said first data bus means and said interface, and a second data transfer path which includes said second data bus means and said special-purpose memory area of said main memory, as needed.

13. A system as recited in claim 12, wherein said central processing unit performs data exchange with said image memory section through said second data transfer path when arbitrary memory addresses of said image memory are discontinuously accessed by random access operation.

* * * * *